United States Patent [19]

Goldbach et al.

[11] Patent Number: 4,822,011
[45] Date of Patent: Apr. 18, 1989

[54] ELASTICALLY DEFORMABLE SYNTHETIC ABSORBER FOR BUMPERS

[75] Inventors: Hubert Goldbach, Ratingen; Roderich Kammerer, Bad Honnef, both of Fed. Rep. of Germany

[73] Assignee: Bayer Aktiengesellschaft, Fed. Rep. of Germany

[21] Appl. No.: 112,281

[22] Filed: Oct. 26, 1987

[30] Foreign Application Priority Data

Nov. 5, 1986 [DE] Fed. Rep. of Germany ....... 3637751

[51] Int. Cl.⁴ ............................................. B60R 19/18
[52] U.S. Cl. ..................... 267/201; 267/140; 267/153; 293/136
[58] Field of Search ............... 267/139, 140, 116, 153, 267/201, 140.1–141.7, 292–294; 188/371–377; 293/102, 107–110, 120–122, 154–155, 132, 133, 134, 135, 136, 103–106; 248/636, 562; 74/492; 280/777; 404/6, 9, 10; 256/13.1; 213/40, 22, 23, 25, 41–44

[56] References Cited

U.S. PATENT DOCUMENTS

| | | | |
|---|---|---|---|
| 3,203,723 | 8/1965 | Montenare | 293/110 X |
| 3,787,083 | 1/1974 | Perlberg | 293/109 |
| 3,804,447 | 4/1974 | Slavin | 293/135 |
| 3,852,150 | 12/1974 | Weller | 293/133 X |
| 3,856,615 | 12/1974 | Dreher | 293/136 X |
| 3,887,223 | 6/1975 | Bez | 293/133 |
| 3,888,531 | 6/1975 | Straza et al. | 293/133 X |
| 3,899,047 | 8/1975 | Maeda et al. | 293/133 X |
| 3,997,207 | 12/1976 | Norlin | 293/133 X |
| 4,039,350 | 6/1977 | Goupy et al. | 293/133 X |
| 4,061,384 | 12/1977 | Montgomery et al. | 293/120 X |
| 4,085,832 | 4/1978 | Gaines et al. | 293/136 X |
| 4,227,593 | 10/1980 | Bricmont et al. | 293/133 X |
| 4,272,114 | 6/1981 | Hirano et al. | 293/133 |
| 4,352,484 | 10/1982 | Gertz et al. | 293/133 X |
| 4,542,925 | 9/1985 | Huber et al. | 293/109 X |

FOREIGN PATENT DOCUMENTS 316495 11/1956 Fed. Rep. of Germany ...... 293/136

Primary Examiner—Douglas C. Butler
Attorney, Agent, or Firm—Connolly and Hutz

[57] ABSTRACT

A shock absorber, arranged between bumper and body, possesses elastically deformable elements (2) which support themselves against sliding surfaces (8), whose contact pressure is adjustable across additionally arranged elastic bodies (10).

10 Claims, 4 Drawing Sheets

ELASTICALLY DEFORMABLE SYNTHETIC ABSORBER FOR BUMPERS

The invention relates to synthetic absorbers for bumpers for the destruction-free absorption of shock energy during the crashing of an automobile, consisting of one bearing in the region of the bumper and one bearing in the region of the automobile body, between which an element is arranged in suspension.

In order to avoid damage to the body of an automobile during crashes in the region of low speeds, it is desirable to install an element between bumper and body, which transforms the resulting energy into heat, as far as possible.

Metallic hydraulic shock absorbers are known as elements, in which the oil is pressed across nozzles of a piston into the free cylinder space. Because of the system-conditioned piston control in one direction, such shock absorbers are unfavorable for slanting or one-sided shocks, such as occur frequently in driving accidents. Also, the technical requirements and the maintenance required are great, as precision parts are involved.

Further, shock absorbers of synthetic material are known which contain a honeycomb structure at the core, which deform permanently under loading and thereby absorb the shock energy.

Because of the permanent deformation of the construction, the aggregate must then be completely exchanged.

The object of the invention is to find a synthetic absorber for a bumper, which, at a colliding speed of the automobile of up to 8 kilometers per hour and a deformation path of less than 50 to 70 millimeters, and in which, despite great energy transformation and high absorption, no permanent material or shape changes appear after the removal of loading.

The object is solved according to the invention, in that at least one elastically deformable element of synthetic material, which supports itself on sliding surfaces, is adjustable across additionally arranged elastic bodies, in the course of its movement.

The construction according to the invention allows the solidity of the synthetic material under loading of the colliding forces to be used right into the allowed limiting region, which, however, is never crossed, as the deformable elements then move off on the sliding surfaces. Further, it has been shown that due to the elastic body a force-distance gradient—the force rises steeply over a short distance and again rises slightly over a long distance, then falling steeply over a short distance—yields a hysteresis loop, from which it follows that a large amount of energy is transformed during the shock. As the movement of the element is only slowly braked, the element, which, after all, is freely mobile, returns to its starting position without great vibrations.

It is thus possible for the man skilled in the art to design the synthetic absorber suitable for use in a manner according to the demands by means of adequate constructive measures and choice of working materials.

It is possible, with an element with a central frame and ribs attached at both sides at an angle of 60° to 85°, to determine in advance the start of sliding of the sliding surfaces on the wall of the casing by means of elastic bodies and by means of the moment of inertia or the curvature of the ribs, so that the force-distance gradient can be made steep in the first section. Subsequently, a deformation occurs, which finally ends with a further rise of force. After the removal of loading, the force is again braked over a short distance. As the elastic bodies do not impede this movement, but even support it, the original shape is once more attained. Through the hysteresis, a large part of the energy is transformed into heat, which can then flow off without obstruction.

In another synthetic absorber, the legs facing each other, of slanting or v-shaped elements lying opposite each other in inverted formation, slide towards each other, wherein the sideways pressure besides the pre-stressing yielded by shaping is further increased by filling out both sides with synthetic foam. At the same time, the foam dampens the movements, by which means increasing vibrations of the system are avoided.

In an advantageous embodiment, the sliding surfaces are structured by elevations (bumps) or depressions (grooves), all layered with frictional material, by which means the coefficient of sliding friction can be varied according to the demands.

Synthetic foam foamed in situ has shown itself to be especially advantageous for elastic bodies, as, besides the application of supporting force, it also prevents over-oscillating during the removal of loading. The volume and the thickness should be so great that the actual synthetic element is not yet damaged under complete compression.

Straight or bent elastic strips are conceivable, which bend under strong loading. By changing the stiffness, for example by at least two fixing devices of parallel strips anchored opposite each other, the time and size of the through-bending can be exactly set.

A further adjustment is possible through the step-wise application and/or combination of various elastic bodies.

The supporting force can also be summoned up by means of a brace, if the facing limbs of the elastic element are joined by tension devices such as ropes, ties and/or ribs. After being put on an occasionally expanding body, the tension device is put under ever more tension during shrinking, by which means the contact force of the limbs against the common sliding surfaces is increased. The limbs, or the bearing, can therein be curved, so that the bearing of force can be influenced in desired fashion by means of the restriction of a contact surface at various points in time.

The beam tie remains unimpeded in its functioning right up to the complete compression of the synthetic shock absorber by means of slits in the bearing.

Finally, a recoil device in the form of an elastic foam material or a spring can be installed, so that the shock absorber returns to its starting position after the shock event is completed.

Further, it is advantageous to arrange the elements in a closed frame or a casing, which can then be arranged as a unit (shock absorber) between bumper and vehicle frame.

An example of the invention is represented in the figures and will be described in the following. In the figures.

Figure 1:
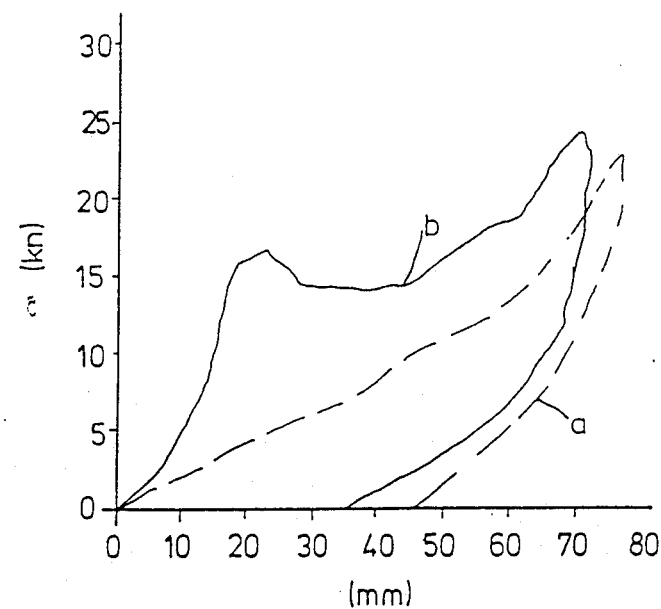
FIG. 1 shows a force-distance diagram

Diagrams are shown in FIG. 1, giving the force-distance gradient of various synthetic absorbers. In shock absorbers with synthetic material, curve a increases more or less proportionally to the distance, then dropping quickly after the removal of loading. By contrast, curve b of the construction according to the invention has a steep slope over the first part of the distance, which then runs almost parallel, finally returning to the starting position. Here it becomes clear that the work performed, and there with the transformed energy, is much more advantageous in the construction according to the invention, because of the surface crossed, force distance, than in the first case.

Figure 2:
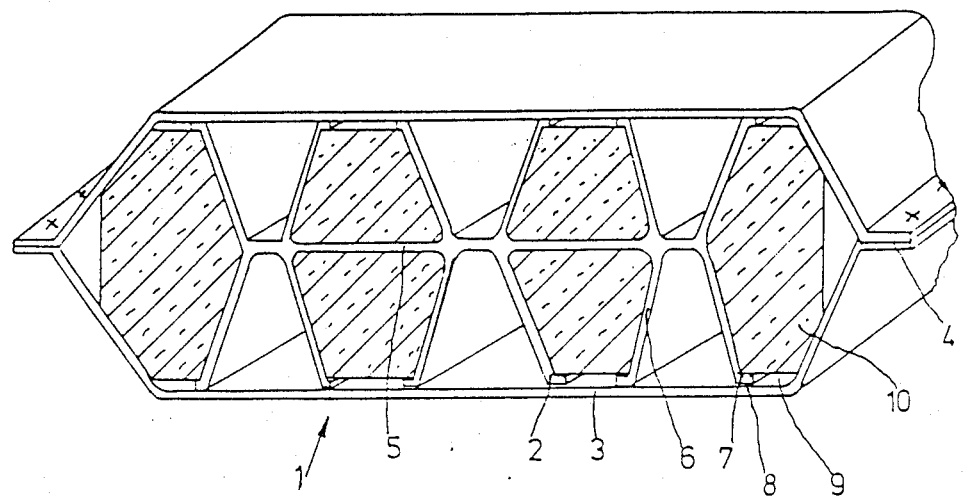
FIG. 2 shows a synthetic absorber of x-element with synthetic foam

In FIG. 2, a synthetic absorber 1 with x-shaped elements 2 in a two-part casing 3 with connecting flange 4 is represented. The element 2 consists of a central frame 5, possessing slanting ribs 6 on both sides, which are provided at the end with a bent-away limb 7 with sliding surfaces 8. The limbs 7 support themselves against the inner wall 9 of the casing 3. Further, synthetic foams 10 are arranged as elastic bodies each between the ribs 6 inclined to each other.

Figure 3:
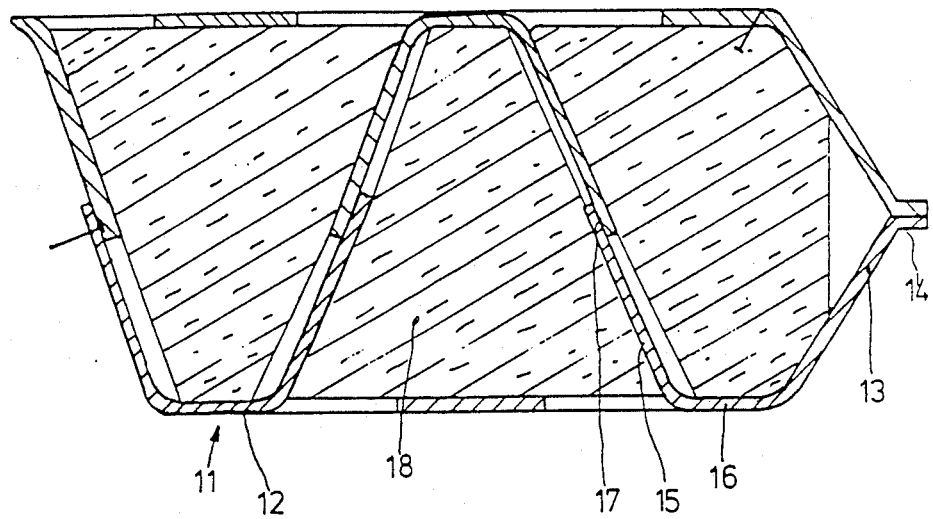
FIG. 3 shows a shock absorber of u-element with synthetic foam

In FIG. 3, a synthetic absorber 11 is provided with v- or u-shaped elements 12 arranged in mirror-formation and displaced, which are integrated in to the casing 13 with connecting flange 14. The inclined ribs 15 arranged on both sides of the cross-piece 16 formed as the wall of the casing 13 touch at the sliding surfaces 17. The intervening space is filled out with a synthetic foam 18.

Figure 4:
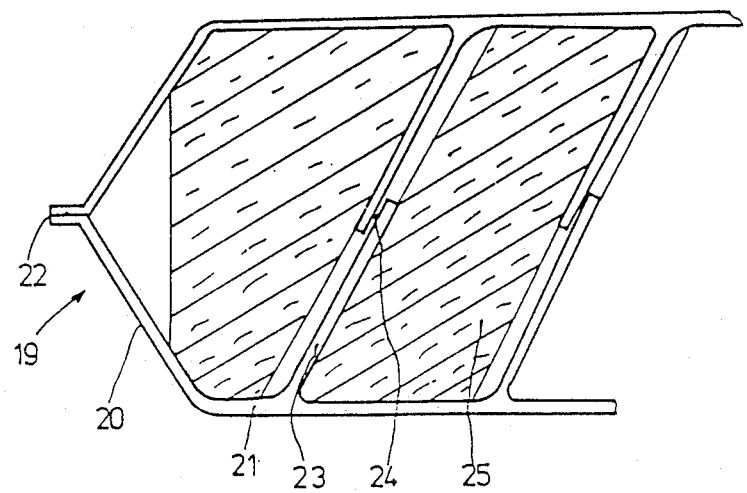
FIG. 4 shows a synthetic absorber of trapeze-element with synthetic foam

In FIG. 4, a synthetic absorber 19 is represented with trapeze-shaped elements 20 fitted together in the casing 21 including connecting flange 22, in which equally inclined ribs 23 are arranged inside. These touch one another in the overlapping region at their grooved sliding surfaces 24. On each side of the ribs 23 there is a synthetic foam 25 in the spaces between.

Figure 5:
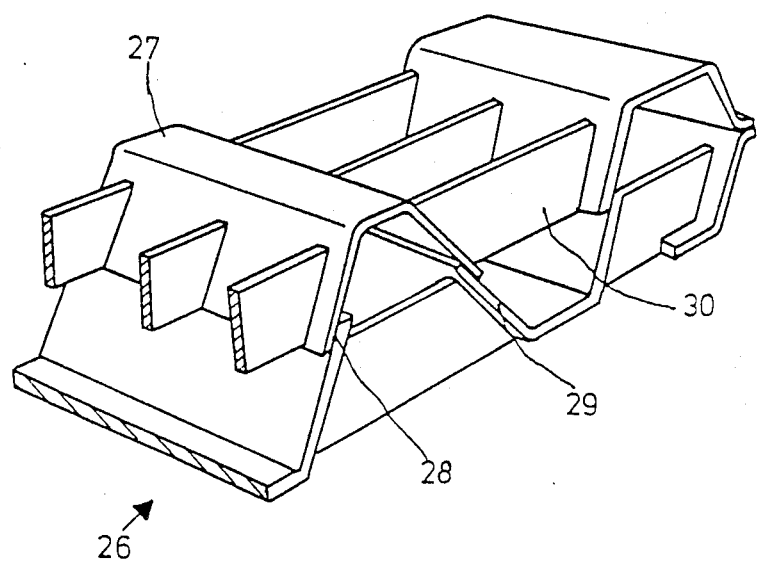
FIG. 5 shows a synthetic absorber of u-element with synthetic strips

In FIG. 5, a perspective of a synthetic absorber 26 with elements 27 is drawn, in which the sliding surfaces 28 of the engaging ribs 29 are pressed against each other by elastic bodies in the shape of synthetic strips 30.

Figures 6, 7:
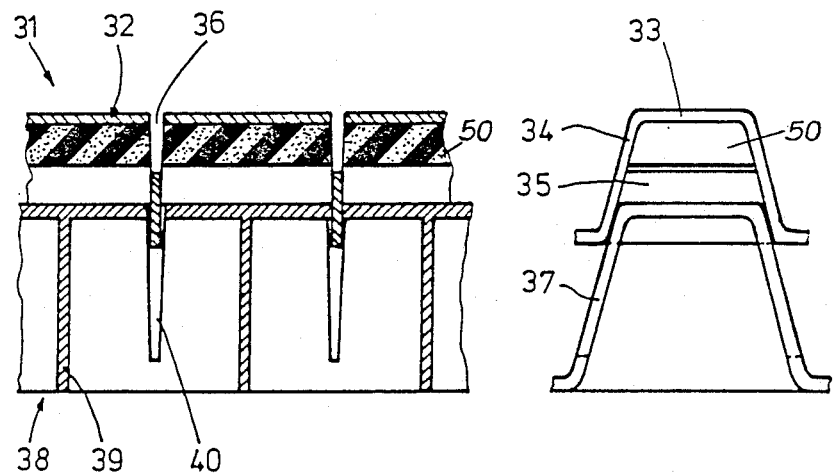
FIG. 6 shows a synthetic absorber with beam-tie in slits
FIG. 7 is an end view of the absorber shown in FIG. 6

A different embodiment of a synthetic absorber 31 is represented in section or side elevation in FIGS. 6 and 7. The elastic synthetic element 32 consists of a bar 33, which is provided on both sides with limbs 34 inclined outwards, where in each case limbs 34 lying opposite each other are connected by tension members in the form of beam ties 35, which are accessible from above for shaping across a cleft 36. The ends of the limbs 34 support themselves at their exterior against corresponding inclined surfaces 37 of the firm bearing 38 with trapeze-like section and ribs 39. The slits 40 serve for receiving the beam tie 35 during the lowering of the element 32, whose tensile stress increases with the widening of the separation between limbs, whereby the frictional force is increased. Elastic foam 50 is arranged between element 32 and fixed bearing 38

We claim:

1. A shock absorber for bumpers providing damage-free absorption of shock energy during vehicle crashes for placement between a vehicle bumper and a vehicle body, the shock absorber consisting of at least one elastically deformable element and a support body, the elastically deformable element and the support body each having mutually engaging flat sliding surfaces which form an angle with respect to the direction of movement of the element, upon impact elastic body means between portions of the elastically deformable element and the support body adapted to influence the deformation and movement of the elastically deformable element during impact.

2. A shock absorber as in claim 1 wherein the support body envelops the elastically deformable element.

3. A shock absorber as in claim 1 wherein the elastically deformable element includes a central frame and alternately inclined deformable ribs on both sides of the central frame, the deformable ribs having end portions that engage the support body, the rib end portions and the support body forming the mutually engaging sliding surfaces.

4. A shock absorber according to claim 1 wherein the elastically deformable element has deformable ribs and the support body has deformable ribs positioned opposite in mutually engaging relationship with each other.

5. A shock absorber according to claim 1 wherein the elastic body means comprises synthetic foam.

6. A shock absorber according to claim 1 including additional elastic body means comprising elastically deformable strips arranged between the elastically deformable element and the support body.

7. A shock absorber according to claim 1 including additional elastic body means of differing elasticity.

8. A shock absorber according to claim 1 wherein the elastically deformable element includes limbs facing each other and outwardly inclined relative to each other, the limbs being supportingly arranged on correspondingly inclined surfaces of the support body.

9. A shock absorber according to claim 8 including beam ties arranged as tension members in the direction of movement next to the corresponding inclined surfaces.

10. A shock absorber according to claim 8 wherein the elastic body means includes elastic foam arranged between the element and the support body.

* * * * *